March 26, 1957
O. C. KLUNGTVEDT
2,786,434
WELDERS WORK HOLDER
Filed Oct. 16, 1952
2 Sheets-Sheet 1
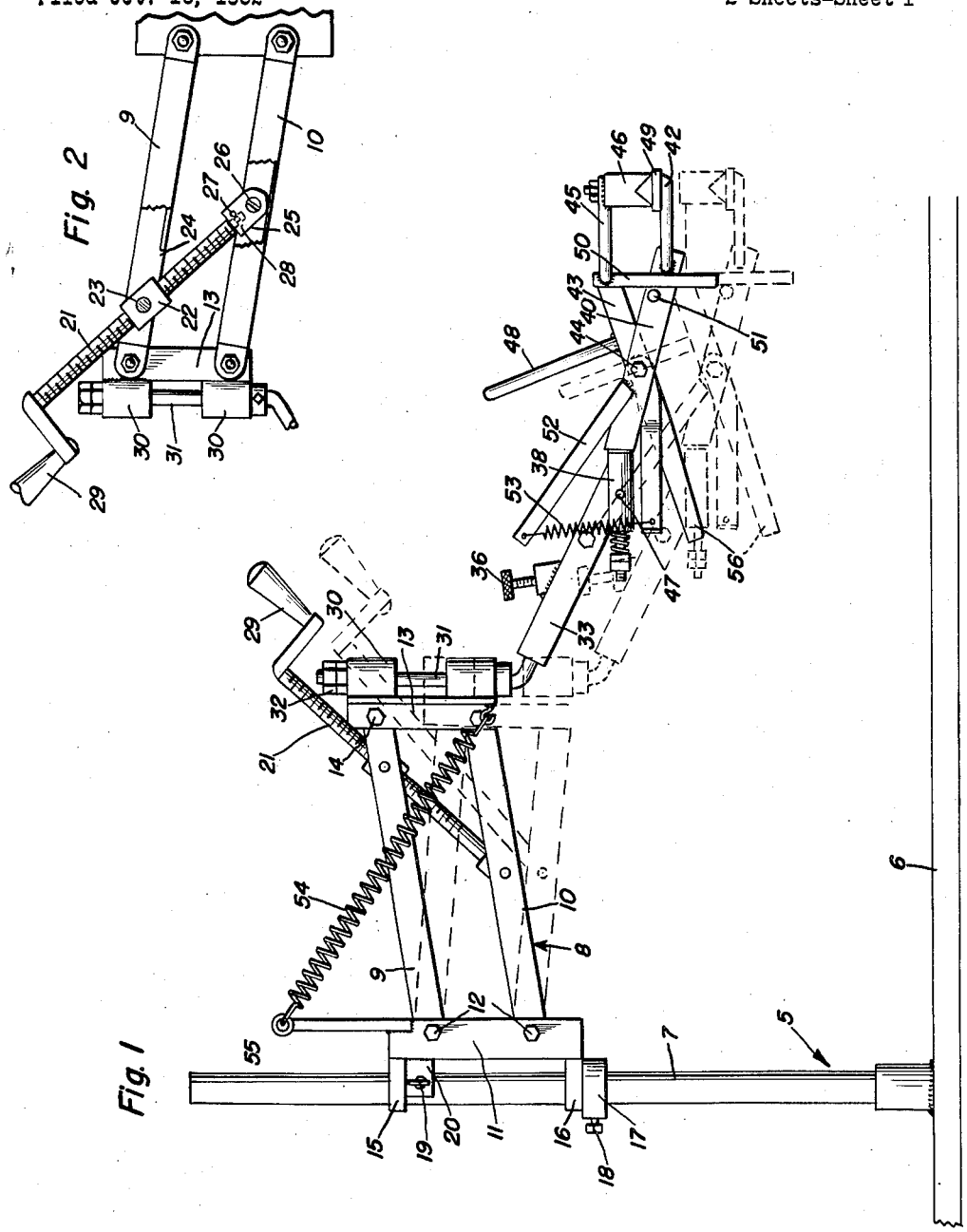
Orrin C. Klungtvedt
INVENTOR.
BY *Clarence A. O'Brien
and Harvey B. Jacobson*
Attorneys March 26, 1957     O. C. KLUNGTVEDT     2,786,434
WELDERS WORK HOLDER
Filed Oct. 16, 1952     2 Sheets-Sheet 2
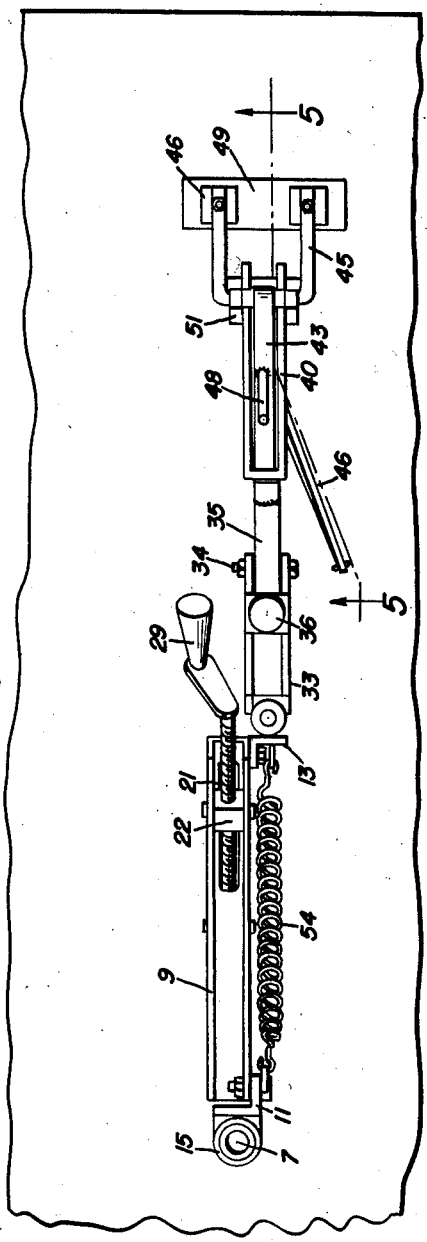
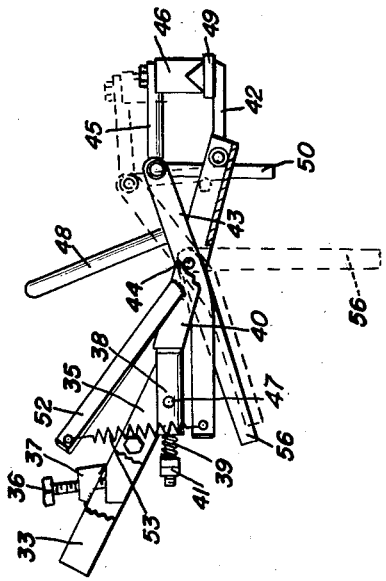
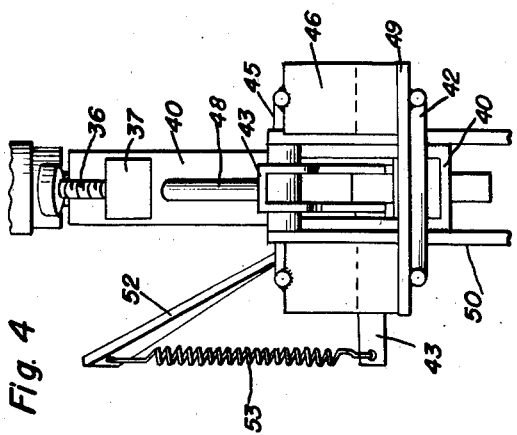
Orrin C. Klungtvedt
INVENTOR.
BY
Attorneys

United States Patent Office 2,786,434
Patented Mar. 26, 1957

2,786,434

WELDERS WORK HOLDER

Orrin C. Klungtvedt, Rushford, Minn.

Application October 16, 1952, Serial No. 315,009

2 Claims. (Cl. 113—104)

The present invention relates to new and useful improvements in welder's work holders and more particularly to a stand on which a work holding clamp is mounted for holding the work to be welded in a desired universally adjusted position.

An important object of the invention is to provide a horizontally and vertically swingable frame mounted on a standard and an arm projecting outwardly from the frame for supporting a pair of work holding jaws and wherein the jaws may be adjusted angularly on the arm.

Another object of the invention is to construct the work holding jaws with pivoted arms or handles for opening and closing the jaws as well as with means maintaining the jaws parallel to each other during opening and closing movement.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a side elevational view.

Figure 2 is a side elevational view of the inner vertically swingable frame and with parts broken away and shown in sections.

Figure 3 is a top plan view.

Figure 4 is an enlarged front elevational view, and

Figure 5 is a longitudinal sectional view taken on line 5—5, Figure 3.

Referring now to the drawings in detail wherein for the purpose of illustration I have disclosed a preferred embodiment of invention and numeral 5 designates a stand generally and which includes a base 6 and standard 7.

The inner frame of the work holder is designated generally at 8 and comprises upper and lower channel members 9 and 10 which are secured in parallel relation with respect to each other by means of an inner vertical angle iron bar 11 to which the inner ends of the channel arms 9 and 10 are pivoted for vertical swinging movements by means of bolts and nuts or the like 12 and an outer vertical angle iron bar 13 to which the outer ends of the arms 9 and 10 are pivoted for vertical swinging movement by means of bolts and nuts or the like 14.

Upper and lower vertical alined eyes 15 and 16 are welded or otherwise suitably secured to the inner vertical bar 11 and are mounted on the standard 7 for horizontal swinging movement of the frame 8. A collar 17 is secured in vertically adjusted position under the lowermost eye 16 by means of a set screw 18. The frame 8 is locked in its horizontally swingable position by means of a thumb screw 19 carried by a lug 20 welded to the inner vertical bar 11 and engaging the standard 7.

The outer end of frame 8 is raised and lowered by means of a feed screw 21 which is threaded through a block 22 formed with trunnions 23 which are pivoted in the upper channel arm 9 adjacent its outer end, the screw passing downwardly through a slot 24 in the channel arm 9 in an inwardly inclined position and with its lower end rotatably positioned in a lower block 25 pivoted to the lower channel arm 10 by means of trunnions 26. The lower end of the screw is locked in the lower block against longitudinal movement by means of a transverse pin 27 engaged in a circumferential groove 28 in the lower end of the screw. The upper end of the screw is provided with a crank handle 29.

A pair of vertically alined eyes 30 are welded or otherwise suitably secured to the outer vertical bar 13 and in which a vertical rod 31 is rotatably mounted and secured in the eyes by means of a nut 32 threaded on the upper end of the rod. An arm 33 is welded or otherwise suitably secured to the lower end of rod 31 and extends in a downwardly inclined position therefrom. Arm 33 is of channel shaped construction and a pivot pin 34 extends transversely of the arm adjacent its outer end and on which an extension 35 is pivoted for vertical swinging movement. The extension is held in adjusted position by means of a thumb screw 36 threaded downwardly through a guide 37 which is welded or otherwise suitably secured on top of the arm 33 and with the lower end of the thumb screw 36 bearing on top of the inner end of the extension 35, as shown to advantage in Figure 5 of the drawing.

The outer end of extension 35 is welded to a horizontal sleeve 38 in which a rod 39 is positioned for turning movement. A channel shaped arm 40 is welded or otherwise suitably secured to the front end of rod 39 and projects forwardly from sleeve 38 in a downwardly inclined position. Rod 39 and arm 40 are secured against turning movement in sleeve 38 by means of a nut 41 threaded on the rear end of the rod and also by means of a setscrew 47.

A lower U-shaped clamping jaw 42 is welded to and projects forwardly from the front end of arm 40 and an upper jaw arm 43 is pivoted to the lower jaw arm 40 by means of a transverse pin 44 and an upper U-shaped clamping jaw 45 is vertically pivoted at the front end of the upper clamping arm 43. Downwardly extending V-shaped jaw faces 46 are welded to the front ends of jaw 45. A pair of vertical legs 50 are welded at their upper ends to the rear portions of upper jaw 45 and are slidable between the rear portion of lower jaw 42 and a pair of laterally projecting pins 51 to maintain the jaws parallel to each other during their opening and closing movement.

A bracket arm 52 is welded or otherwise suitably secured to lower jaw arm 40 and extends rearwardly therefrom in an upwardly inclined position. A coil spring 53 connects the rear end of upper jaw arm 43 to the bracket 52 to hold the jaw 45 in its lowered clamping position.

A handle 48 is welded to the upper jaw arm 43 and by means of which the arm 40 may be turned in sleeve 38 to angularly adjust the work 49 clamped between the jaws 42 and 45.

The weight of the outer end of frame 8 is relieved by means of a coil spring 54 which is attached at one end to the lower end of outer vertical bar 13 and is attached at its other end to an upstanding bracket 55 rising from the inner vertical bar 11.

In the operation of the device the outer end of frame 8 is adjusted vertically on the inner pivots for arms 9 and 10 by means of the feed screw 21 to thus raise and lower the work holding jaws 42 and 45 as a unit.

The working holding jaws may also swing horizontally by means of arm 33 and vertical rod 31 and the work clamped between the jaws may be adjusted angularly by turning the arm 40 in the sleeve 38.

The rear end of upper jaw arm 33 is inclined laterally with respect to lower jaw arm 40, as shown in Figure 4 of the drawings and constitutes a handle by means of which the upper jaw 45 may be raised to release the work.

One or more legs 56 are vertically pivoted on the pin 44 for supporting the jaw arms 40 and 43 on a work bench, and the legs may be raised, when not in use.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A welder's work holder comprising a supporting stand, a horizontally swingable arm carried by the stand, an extension for the arm, means pivotally connecting the extension to the outer end of the arm for vertical pivotal movement of the extension on the arm, said extension being pivoted at a point intermediate its front and rear end portions, an adjusting screw carried by the arm and engaging the rear end of the extension to vertically adjust the front end of the extension, a bearing sleeve fixed to the front end of the extension in a position inclined with respect to the longitudinal axis of the latter, a rod rotatably mounted in the sleeve, means lockably securing the rod in rotatably adjusted position in the sleeve, and a pair of coacting work clamping jaws carried at the front end of said rod.

2. A welder's work holder comprising a supporting stand, a horizontal swingable arm carried by the stand, an extension for the arm, means pivotally connecting the extension to the outer end of the arm for vertical pivotal movement of the extension on the arm, said extension being pivoted at a point intermediate its front and rear end portions, an adjusting screw carried by the arm and engaging the rear end of the extension to vertically adjust the front end of the extension, a bearing sleeve fixed to the front end of the extension in a position inclined with respect to the longitudinal axis of the latter, a rod rotatably mounted in the sleeve, means lockably securing the rod in rotatably adjusted position in the sleeve, a fixed arm carried by and projecting forwardly from the rod, a pivoted arm carried by the fixed arm, and co-acting work clamping jaws at the front ends of said fixed and pivoted arms.

References Cited in the file of this patent
UNITED STATES PATENTS

| | | |
|---|---|---|
| 316,459 | How | Apr. 28, 1885 |
| 414,843 | Olsen | Nov. 12, 1889 |
| 432,829 | Hirst | July 22, 1890 |
| 979,305 | Hunt | Dec. 20, 1910 |
| 1,084,130 | Cargin | Jan. 13, 1914 |
| 1,313,061 | Brown | Aug. 12, 1919 |
| 1,386,318 | Cowan | Aug. 2, 1921 |
| 1,453,901 | Anderson | May 1, 1923 |
| 1,465,905 | Hoff | Aug. 21, 1923 |
| 1,638,938 | Koenigkramer | Aug. 16, 1927 |
| 1,670,253 | Gilbert et al. | May 15, 1928 |
| 1,751,480 | Howell | Mar. 25, 1930 |
| 2,122,933 | Eckman | July 5, 1938 |
| 2,187,283 | Scheutz | Jan. 16, 1940 |
| 2,266,507 | Neumann et al. | Dec. 16, 1941 |
| 2,366,685 | Chambers | Jan. 2, 1945 |
| 2,459,080 | Killius | Jan. 11, 1949 |
| 2,567,384 | Lietz | Sept. 11, 1951 |
| 2,663,929 | Carpenter | Dec. 29, 1953 |

FOREIGN PATENTS

| | | |
|---|---|---|
| 801,326 | Germany | Jan. 29, 1951 |